(12) United States Patent
Iwato et al.

(10) Patent No.: US 7,639,334 B2
(45) Date of Patent: Dec. 29, 2009

(54) LIQUID CRYSTAL DISPLAY DEVICE

(75) Inventors: Hiroaki Iwato, Mobara (JP); Yoshiki Watanabe, Ootaki (JP); Keiichirou Ashizawa, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 270 days.

(21) Appl. No.: 11/798,278

(22) Filed: May 11, 2007

(65) Prior Publication Data

US 2007/0279565 A1  Dec. 6, 2007

(30) Foreign Application Priority Data

May 31, 2006  (JP)  .............................. 2006-151478

(51) Int. Cl.
  *G02F 1/1339* (2006.01)
(52) U.S. Cl. ...................... 349/138; 349/153
(58) Field of Classification Search ................ None
  See application file for complete search history.

(56) References Cited

U.S. PATENT DOCUMENTS

2007/0091247 A1* 4/2007 Onda .......................... 349/153
2008/0018848 A1* 1/2008 Iwato et al. ................. 349/149
2008/0137022 A1* 6/2008 Komeno et al. ............. 349/153

FOREIGN PATENT DOCUMENTS

JP  2001-337316  12/2001

* cited by examiner

*Primary Examiner*—Mike Stahl
(74) *Attorney, Agent, or Firm*—Stites & Harbison PLLC; Juan Carlos A. Marquez, Esq.

(57) ABSTRACT

The present invention suppresses the spreading by wetting of an orientation film of a liquid crystal display panel outside a display region and, at the same time, maintains the uniformity of film thickness of the orientation film within a display region. In a liquid crystal display device which includes a display panel which arranges a sealing material having an annular shape between a pair of substrates, seals a liquid crystal material in a space surrounded by the pair of substrates and the sealing material, the pair of substrates form orientation films on surfaces thereof opposite to surfaces thereof which face each other, the orientation films are brought into contact with transparent electrodes which are formed on surfaces of transparent substrates by way of insulation layers, at least one substrate out of the pair of substrates includes an elongated groove portion which extends in the direction along an outer periphery of the display region in a substantially annular region which is arranged inside a region where the sealing material is arranged and outside the display region, and the groove portion is formed of recessed grooves which are formed in the insulation layer and an ITO film which extends along side surfaces and bottom surfaces of the recessed grooves.

10 Claims, 15 Drawing Sheets

LIQUID CRYSTAL DISPLAY DEVICE

The present application claims priority from Japanese application JP2006-151478 filed on May 31, 2006, the content of which is hereby incorporated by reference into this application.

BACKGROUND OF THE INVENTION

1. Field of the Invention

The present invention relates to a liquid crystal display device, and more particularly to a technique which is effectively applicable to a control of a coating region of an orientation film.

2. Description of the Related Art

Conventionally, as a display device which displays a video or an image, there has been known a liquid crystal display device which uses a liquid crystal display panel sealing a liquid crystal material between a pair of substrates.

In the liquid crystal display panel, on one substrate out of a pair of substrates, for example, a plurality of scanning signal lines and a plurality of video signal lines are formed. Then, a region which is surrounded by two neighboring scanning signal lines and two neighboring video signal lines corresponds to one pixel region, and a TFT element, a pixel electrode and the like are arranged on each pixel region. This substrate is generally referred to as a TFT substrate. Further, another substrate which forms a pair with the TFT substrate is generally referred to as a counter substrate.

When the liquid crystal display panel adopts a vertical-electric-field method such as a TN method or a VA method, for example, a counter electrode (also referred to as a common electrode) which faces the pixel electrodes of the TFT substrate in an opposed manner is arranged on the counter substrate side. Further, when the liquid crystal display panel adopts a drive method which is referred to as a lateral electric field method such as an IPS method, for example, the counter electrode is arranged on the TFT substrate.

Further, the TFT substrate and the counter substrate form an orientation film thereon for controlling the direction (orientation) of liquid crystal molecules in a state that no potential difference exists between the pixel electrode and the counter electrode and an arrangement and an inclination of the liquid crystal molecules when the potential difference is generated between the pixel electrode and the counter electrode.

The orientation film is formed on an interface with a liquid crystal material (a liquid crystal layer) of each substrate and, for example, is formed by applying rubbing treatment to a surface of a resin film made of polyimide which is formed to cover the whole display region constituted of a mass of the pixel regions.

Further, a resin film which is formed on surfaces of respective substrates is conventionally formed by a method which is referred to as an aniline printing method, for example. However, recently, there has been proposed a method which uses an inkjet printing method (for example, see the following patent document 1). The ink jet method can directly perform drawing on a substrate and hence, the ink jet method has various advantages such as the low contamination attributed to a non-contact process, the reduction of a solution consumption quantity and the shortening of an initial setup time.

Patent document 1: JP-A-2001-337316

SUMMARY OF THE INVENTION

However, in forming the orientation film using the ink jet printing method, it has been pointed out that a size control and a shape control of a periphery of the orientation film are difficult. That is, in printing a material of the resin film on the substrate using the ink jet printing method, there exists a drawback that a control of a printing region is difficult.

Such a drawback is attributed to a fact that, for example, the viscosity of a material which is used in the ink jet printing method is low compared to the viscosity of a material used in the aniline printing method or the like.

Accordingly, for example, when the orientation film is formed using the ink jet printing method on the surface of the TFT substrate on which scanning signal lines, video signal lines, TFT elements, pixel electrodes and the like are formed, for example, a printed material spreads by wetting and may reach a region where a sealing material is formed. When the orientation film reaches the region where the sealing material is formed, for example, the adhesiveness between the sealing material and the TFT substrate (orientation film) becomes insufficient thus giving rise to a drawback that a liquid crystal material leaks.

In forming the orientation film using the ink jet printing method, as a method which prevents the spreading by wetting of the printed material to the sealing material, for example, a method which preliminarily decreases a region to be printed by taking a spreading-by-wetting quantity of printed material into consideration may be considered. However, this method has a drawback that the method is liable to easily generate the irregularities of a film thickness of the material which is printed in the inside of the display region.

Further, as another method, for example, a method which suppresses the spreading by wetting of the printed material by increasing the viscosity of a material to be printed. However, this method has a drawback that the method is liable to generate a region which is not covered with the material by coating due to an ejection failure at the time of printing.

Accordingly, it is an object of the present invention to provide a technique which can suppress the spreading by wetting of an orientation film of a liquid crystal display panel outside a display region and, at the same time, can maintain the uniformity of the film thickness within the display region.

The above-mentioned and other objects and novel features of the present invention will become apparent from the description of this specification and attached drawings.

To briefly explain the summary of typical inventions among the inventions disclosed in this specification, they are as follows.

(1) The present invention provides a liquid crystal display device which includes a display panel which arranges a sealing material having an annular shape between a pair of substrates, seals a liquid crystal material in a space surrounded by the pair of substrates and the sealing material, and forms a display region in a region where the pair of substrates and the liquid crystal material overlap each other in a plan view, wherein the pair of substrates form orientation films on surfaces thereof opposite to surfaces thereof which face each other, the orientation films are brought into contact with transparent electrodes which are formed on surfaces of transparent substrates by way of insulation layers, at least one substrate out of the pair of substrate includes an elongated groove portion which extends in the direction along an outer periphery of the display region in a substantially annular region which is arranged inside a region where the sealing material is arranged and outside the display region, and the groove portion is formed of recessed grooves which are formed in the insulation layer and a conductive layer which extends along side surfaces and bottom surfaces of the recessed grooves, and the conductive layer is made of the same material as the transparent electrodes.

(2) In the liquid crystal display device having the constitution (1), the substrate having the groove portion includes a plurality of scanning signal lines, a plurality of video signal lines which stereoscopically intersect the plurality of scanning signal lines, a TFT element and a pixel electrode which are arranged in a region surrounded by two neighboring scanning signal lines and two neighboring video signal lines, and the conductive layer of the groove portion is made of the same material as the pixel electrode.

(3) In the liquid crystal display device having the constitution (2), the recessed grooves of the groove portion which are formed in the vicinity of end portions of the plurality of scanning signal lines to which scanning signals are inputted are formed for every space defined between two neighboring scanning signal lines.

(4) In the liquid crystal display device having the constitution (2), the recessed grooves of the groove portion which are formed in the vicinity of end portions of the plurality of scanning signal lines on a side opposite to end portions of the plurality of scanning lines to which scanning signals are inputted extend between the end portions of the scanning signal lines on the opposite side and the region where the sealing material is arranged, and a length of the recessed grooves along an outer periphery of the display region is larger than a distance between two neighboring scanning signal lines.

(5) In the liquid crystal display device having the constitution (2), the recessed grooves of the groove portion which are formed in the region close to end portions of the plurality of video signal lines to which video signals are inputted are formed for every space defined between two neighboring video signal lines.

(6) In the liquid crystal display device having the constitution (2), the recessed grooves of the groove portion which are formed in the region close to end portions of the plurality of video signal lines on a side opposite to end portions of the plurality of video signal lines to which video signals are inputted extend between the end portions of the video signal lines on the opposite side and the region where the sealing material is arranged, and a length of the recessed grooves along an outer periphery of the display region is larger than a distance between two neighboring scanning signal lines.

(7) In the liquid crystal display device having any one of the above-mentioned constitutions (1) to (6), a conductive layer of the groove portion is made of ITO (Indium Tin Oxide).

In the liquid crystal display device of the present invention, at least one substrate out of the pair of substrate includes the elongated groove portion which extends in the direction along the outer periphery of the display region in the substantially annular region which is arranged inside the region where the sealing material is arranged and outside the display region. Here, the groove portion is formed of recessed grooves which are formed in the insulation layer and the conductive layer which extends along side surfaces and bottom surfaces of the recessed grooves, and the conductive layer is made of the same material as the transparent electrodes. Due to such a constitution, in forming the orientation film on the display region of the substrate which includes the groove portion by printing or coating a resin material in a liquid form, even when the printed resin material in a liquid form spreads to the outside of the display region, the spreading of the resin material can be prevented by the groove portion. Accordingly, the spreading by wetting of the orientation film on the liquid crystal display panel outside the display region can be suppressed and, at the same time, the uniformity of film thickness of the orientation film within the display region can be maintained.

Although it is desirable that the groove portion is formed on both of pair of substrates of the liquid crystal display panel, it is particularly desirable that the substrate having the groove portion is formed of a substrate (referred to as TFT substrate) which includes the plurality of scanning signal lines, the plurality of video signal lines which stereoscopically intersect the plurality of scanning signal lines, the TFT element and the pixel electrode which are arranged in a region surrounded by two neighboring scanning signal lines and two neighboring video signal lines.

Further, in forming the groove portion in the TFT substrate, the recessed grooves of the groove portion which are formed in the vicinity of end portions of the plurality of scanning signal lines to which scanning signals are inputted are, for example, formed for every space defined between two neighboring scanning signal lines. Here, when the recessed grooves are formed in the vicinity of the display region, for example, there exists a possibility that a film thickness of the orientation film in a peripheral portion of the display region becomes irregular due to splashing of the printed resin material in a liquid form. Accordingly, it is desirable to form the recessed grooves (groove portion) away from the display region.

Further, the recessed grooves of the groove portion which are formed in the vicinity of end portions of the plurality of scanning signal lines on the side opposite to the end portions of the plurality of scanning lines to which scanning signals are inputted are formed between the end portions of the scanning signal lines on the opposite side and the region where the sealing material is arranged, and the length of the recessed grooves along the outer periphery of the display region is set larger than the distance between two neighboring scanning signal lines. Here, it is desirable that the groove portion is formed of one recessed groove whose length along the outer periphery of the display region is larger than the distance between two outermost scanning signal lines out of the plurality of scanning signal lines and the conductive layer.

Further, the recessed grooves of the groove portion which are formed in the vicinity of end portions of the plurality of video signal lines to which video signals are inputted are, for example, formed for every space defined between two neighboring video signal lines. Here, also in this case, when the recessed grooves are formed in the vicinity of the display region, for example, there exists a possibility that a film thickness of the orientation film in a peripheral portion of the display region becomes irregular due to splashing of the printed resin material in a liquid form. Accordingly, it is desirable to form the recessed grooves (groove portion) away from the display region.

Further, the recessed grooves of the groove portion which are formed in the vicinity of end portions of the plurality of video signal lines on the side opposite to the end portions of the plurality of video lines to which video signals are inputted are formed between the end portions of the video signal lines on the opposite side and the region where the sealing material is arranged, and the length of the recessed grooves along the outer periphery of the display region is set larger than the distance between two neighboring video signal lines. Here, it is desirable that the groove portion is formed of one recessed groove whose length along the outer periphery of the display region is larger than the distance between two outermost video signal lines out of the plurality of video signal lines and the conductive layer.

Further, in forming the conductive layer of the groove portion using the same material as the transparent electrodes (pixel electrodes), for example, ITO (Indium Tin Oxide) may be used as the material.

DESCRIPTION OF THE PREFERRED EMBODIMENTS

Hereinafter, the present invention is explained in detail in conjunction with modes for carrying out the invention (embodiments) by reference to drawings.

Here, in all drawings for explaining the embodiments, parts having identical functions are given same symbols and their repeated explanation is omitted.

Figure 1:
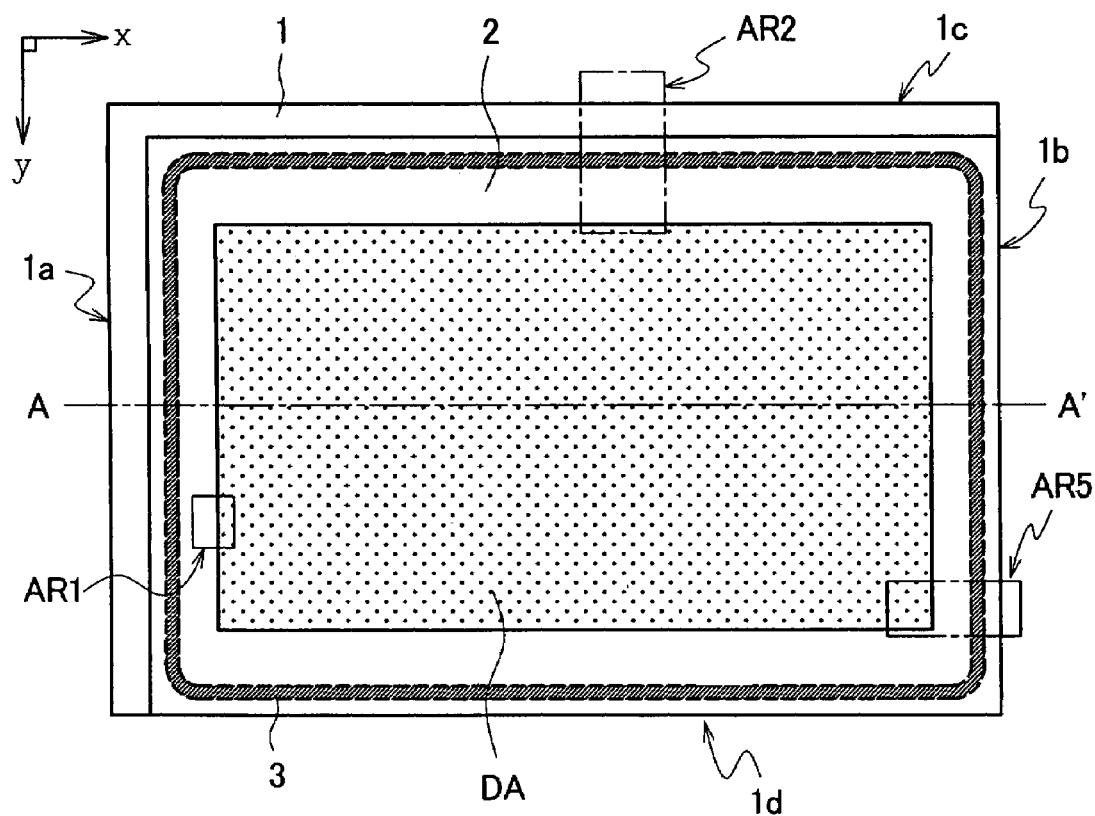
FIG. 1 is a schematic plan view showing the schematic constitution of a liquid crystal display panel of one embodiment according to the present invention.
Figure 2:
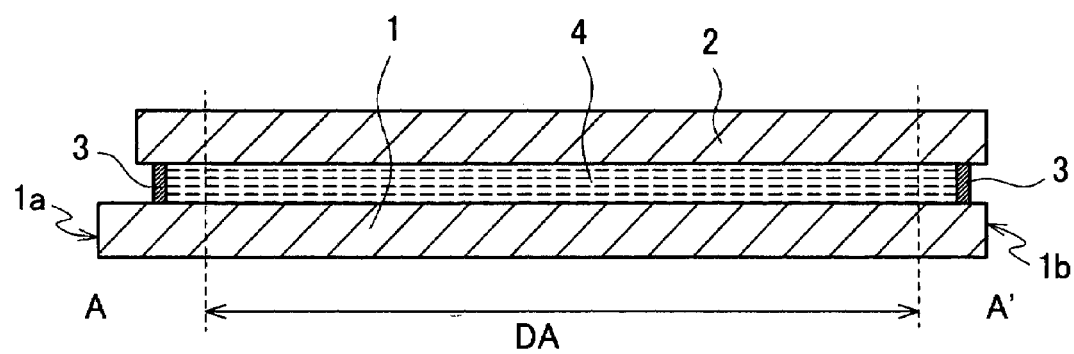
FIG. 2 is a schematic cross-sectional view taken along a line A-A' in FIG. 1.

FIG. 1 is a schematic plan view showing the schematic constitution of a liquid crystal display panel of one embodiment according to the present invention. FIG. 2 is a schematic cross-sectional view taken along a line A-A' in FIG. 1.

The display device according to the present invention is, for example, as shown in FIG. 1 and FIG. 2, a liquid crystal display device which includes a liquid crystal display panel in which an annular sealing material 3 is arranged between a pair of substrates 1, 2 and a liquid crystal material 4 is sealed in a space surrounded by the pair of substrates 1, 2 and the sealing material 3. Here, a display region DA for displaying a video or an image is formed in a region where the pair of substrates 1, 2 and the liquid crystal material 4 overlap each other in a plan view.

Further, the pair of substrates 1, 2 differs from each other in a profile size in a plan view. When the liquid crystal display device is a large-sized display device such as a television receiver set or a display for a PC (Personal Computer), the pair of substrates 1, 2 overlap each other along one side out of two sides parallel to the x direction and along one side out of two sides parallel to the y direction in a plan view.

Further, the larger substrate 1 out of the pair of substrates is mainly referred to as a TFT substrate. Although not shown in the drawing, on the TFT substrate, for example, a plurality of scanning signal lines which extends in the x direction and a plurality of video signal lines which extends in the y direction are formed. Further, in the TFT substrate 1, a region surrounded by two neighboring scanning signal lines and two neighboring video signal lines corresponds to one pixel region and a TFT element and a pixel electrode are arranged in each pixel region.

Further, the smaller substrate 2 out of the pair of substrates is mainly referred to as a counter substrate. When the liquid crystal display panel is a RGB color liquid crystal display panel, one pixel (1 dot) of a video or an image is constituted of three sub pixels and, on the counter substrate 2, a red (R) color filter, a green (G) color filter and a blue (B) color filter are arranged for respective sub pixels.

Further, when the liquid crystal display panel adopts a driving method which is referred to as a vertical electric field method such as a TN method or a VA method, for example, a counter electrode (also referred to as a common electrode) which faces the pixel electrodes of the TFT substrate 1 in an opposed manner is formed on the counter substrate 2. Further, when the liquid crystal display panel adopts a driving method which is referred to as a lateral electric field method such as an IPS method, for example, the counter electrodes are formed on the TFT substrate 1.

Further, out of two sides 1a, 1b of the TFT substrate 1 which are arranged in parallel to the y direction, the side 1a which does not overlap a side of the counter substrate 2 is a side to which, for example, a driver IC for inputting scanning signals to respective scanning signal lines, or a COF or a TCP on which the driver IC is mounted is connected. Further, respective scanning signal lines are connected to gates of the TFT elements which are arranged in respective pixel regions. Accordingly, in the following explanation, the side 1a to which the driver IC for inputting the scanning signals or the COF or the TCP on which the driver IC is mounted is referred to as a gate side and another side 1b which is parallel to the gate side is referred to as an opposite gate side.

Further, out of two sides 1c, 1d of the TFT substrate 1 which are parallel to the x direction, the side 1c which does not overlap a side of the counter substrate 2 is a side to which, for example, a driver IC for inputting video signals (also referred to as grayscale signals) to respective video signal lines, or a COF or a TCP on which the driver IC is mounted is connected. Further, respective video signal lines are connected to drains of the TFT elements which are arranged in respective pixel regions. Accordingly, in the following explanation, the side 1c to which the driver IC for inputting the video signals or the COF or the TCP on which the driver IC is mounted is referred to as a drain side and another side 1d which is parallel to the drain side is referred to as an opposite drain side.

Figure 3:
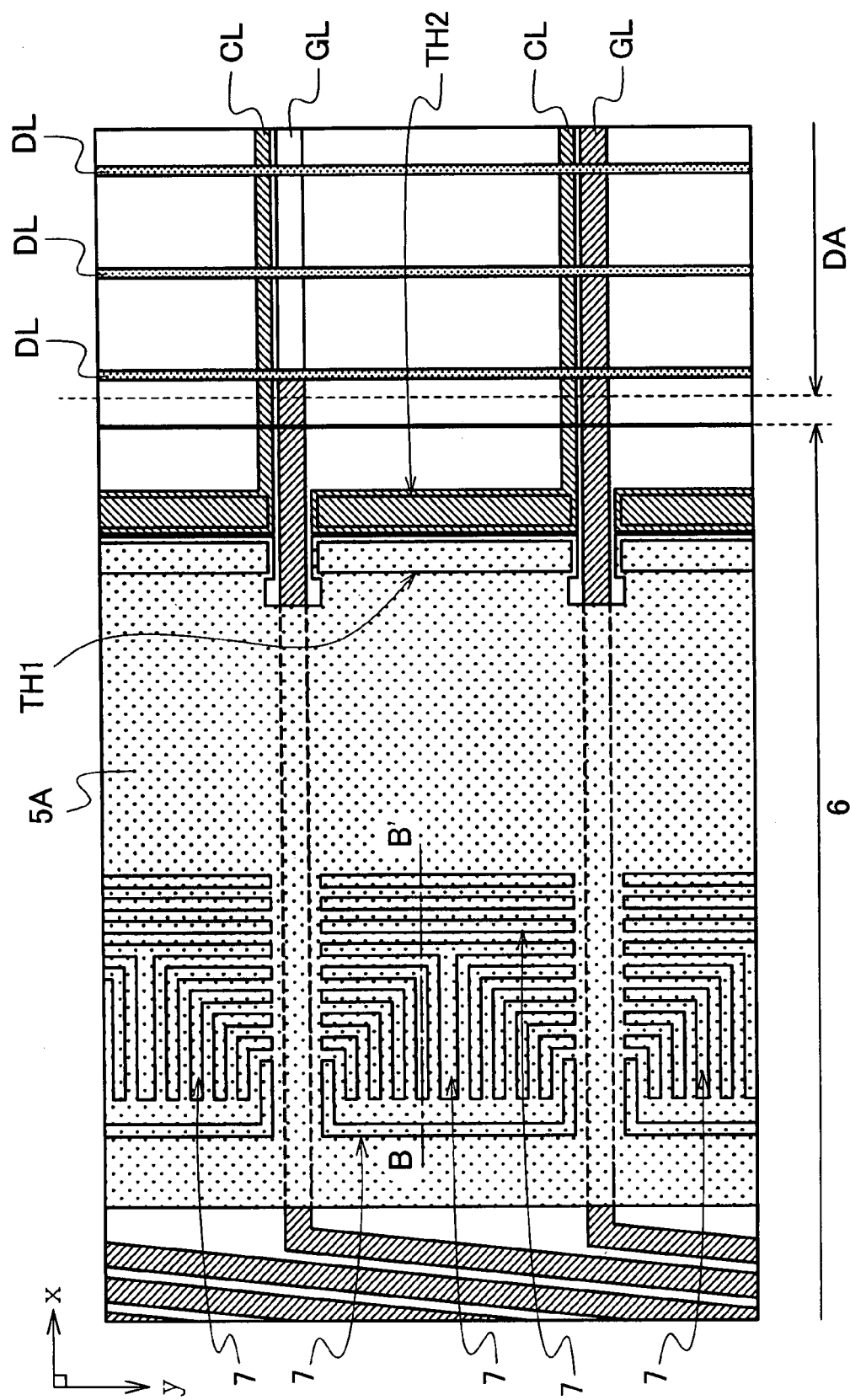
FIG. 3 is a schematic plan view showing the schematic constitution of a TFT substrate in a region AR1 shown in FIG. 1 in an enlarged manner.
Figure 4:
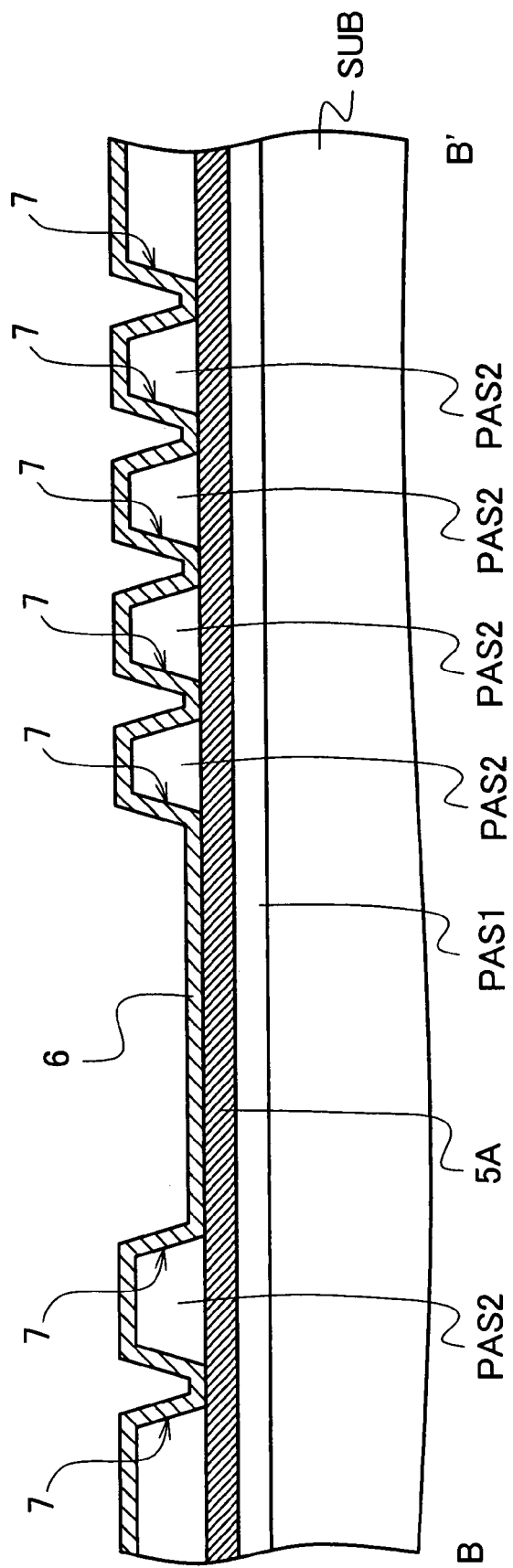
FIG. 4 is a schematic cross-sectional view taken along a line B-B' in FIG. 3.

FIG. 3 is a schematic plan view showing the schematic constitution of the TFT substrate in a region AR1 shown in FIG. 1 in an enlarged manner. FIG. 4 is a schematic cross-sectional view taken along a line B-B' in FIG. 3.

In the liquid crystal display panel of the embodiment, to show a vicinity of an outer periphery of the display region of the TFT substrate 1 arranged close to the gate side 1a in an enlarged manner, for example, as shown in FIG. 3 and FIG. 4, outside the display region DA in which the pixel regions each of which is surrounded by two neighboring scanning signal lines GL and two neighboring video signal lines DL are two-dimensionally arranged, for example, a common bus line 5A which is simultaneously formed with the video signal lines DL is formed. Here, the common bus line 5A is formed on a surface of the glass substrate SUB by way of a first insulation film PAS1. Here, the first insulation layer PAS1 is an insulation layer which is interposed between the scanning signal lines GL and the video signal lines DL in the display region DA, and the first insulation layer PAS1 is interposed between the common bus line 5A and the scanning signal line GL in a region where the common bus line 5A and the scanning signal lines GL intersect each other.

Further, on the common bus line 5A, a second insulation layer PAS2 and a conductive layer 6 are formed. Here, through holes TH1 shown in FIG. 3, for example, are formed in the second insulation layer PAS2, and the conductive layer 6 is electrically connected with the common bus line 5A via the through holes TH1. Further, for example, the conductive film layer 6 is electrically connected by through holes TH2 to common signal lines CL or holding capacitance lines which are arranged parallel to the scanning signal lines. Further, the conductive layer 6 is formed of the same transparent electrode material as the pixel electrodes which are formed in the pixel regions, and the conductive layer 6 is made of ITO, for example.

Further, in the liquid crystal display panel of this embodiment, in the TFT substrate 1, as shown in FIG. 3 and FIG. 4, apart from the through holes TH1, TH2, recessed grooves 7 are formed in the second insulation layer PAS2 on the common bus line 5A and these recessed grooves 7 are covered with the conductive layer 6. Here, the recessed grooves 7 are, for example, as shown in FIG. 3, constituted of elongated grooves which extend in the direction (a y direction) along the outer periphery of the display region DA, grooves which are bent in the x direction orthogonal to the y direction and grooves which are bifurcated. Further, the recessed grooves 7 form a pattern of grooves formed between two neighboring scanning signal lines GL as a unit, and each pattern is formed for every space defined between two neighboring scanning signal lines GL.

Figure 5:
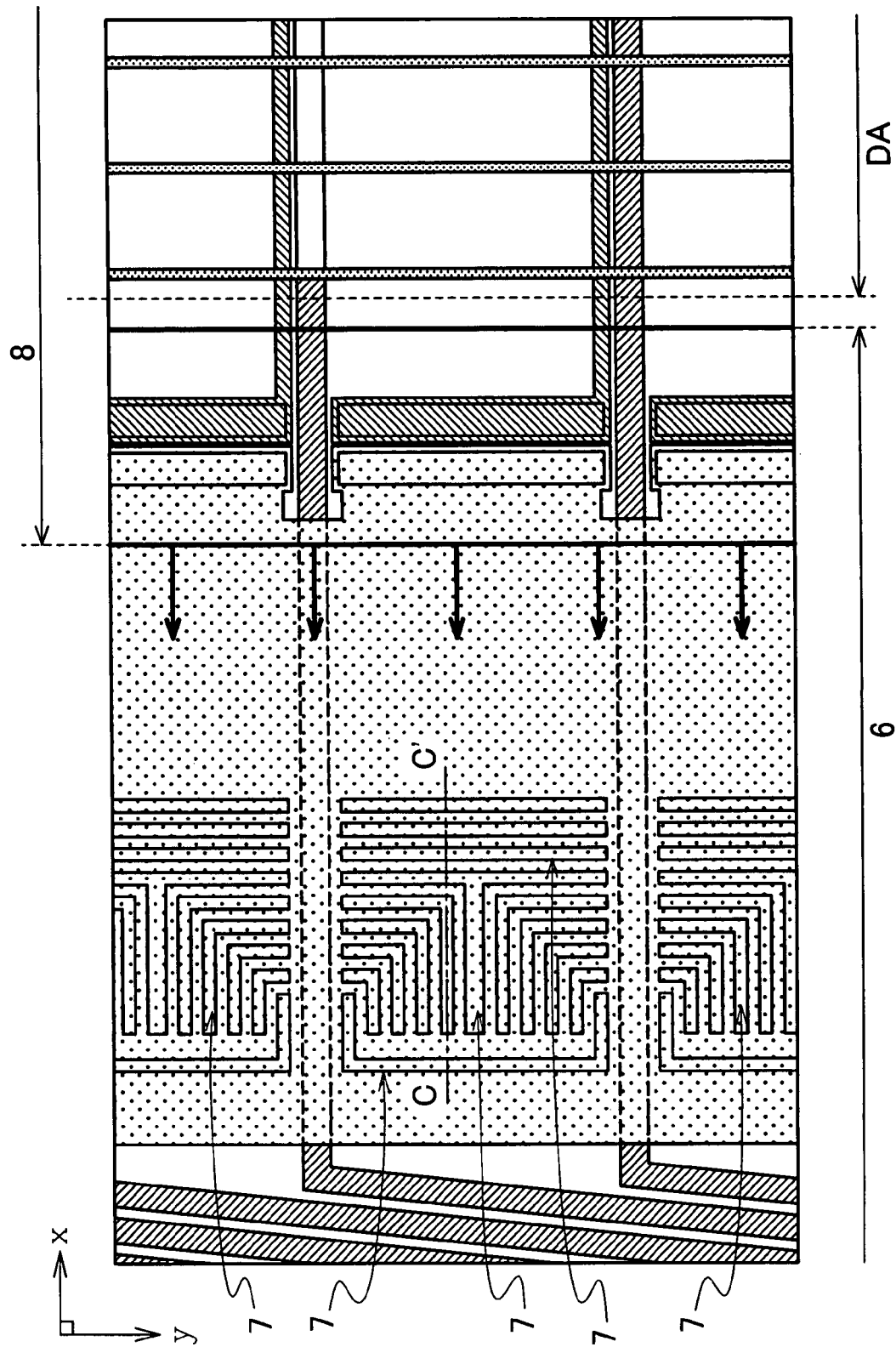
FIG. 5 is a schematic plan view for explaining spreading of a material when the orientation film is printed.
Figure 6:
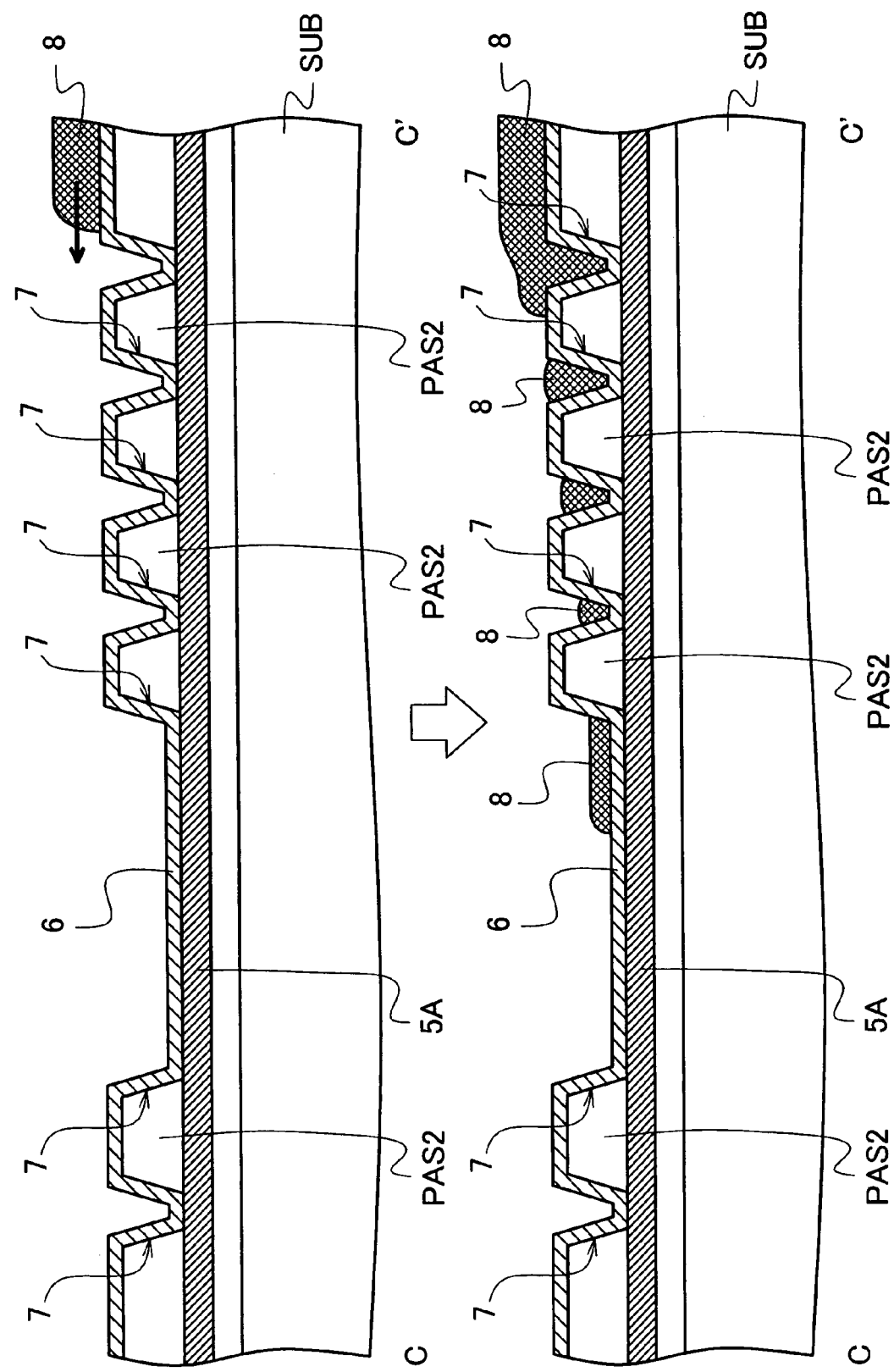
FIG. 6 is a schematic cross-sectional view taken along a line C-C' in FIG. 5.

FIG. 5 and FIG. 6 are schematic views for explaining the manner of operation and advantageous effects obtained by the liquid crystal display panel of this embodiment.

FIG. 5 is a schematic plan view for explaining spreading of a material when the orientation film is printed. FIG. 6 is a schematic cross-sectional view taken along a line C-C' in FIG. 5. Here, FIG. 5 is a schematic plan view showing the schematic constitution of the TFT substrate in the region AR1 shown in FIG. 1 in an enlarged manner.

In the liquid crystal display panel of this embodiment, in forming the orientation film on the TFT substrate 1, for example, using an inkjet printing method or the like, a resin material in a liquid form is printed only on the display region DA and on a slight region around the display region DA and is baked. Here, the resin material in a liquid form which is printed using the inkjet printing method, for example, as shown in FIG. 5, spreads by wetting in the direction toward outside from the display region DA. Further, in a case of a conventional TFT substrate 1, in a region close to a gate side 1a of the TFT substrate 1, a resin material 8 in a liquid form easily spreads by wetting along the extending direction of the scanning signal lines GL and reaches a region where the sealing material 3 is arranged.

However, in the TFT substrate 1 of this embodiment, when the printed resin material 8 in a liquid form spreads by wetting in the direction toward the gate side 1a from the display region DA, before reaching the region where the sealing material 3 is arranged, the resin material 8 in a liquid form passes the groove portion constituted of the recessed grooves 7 formed in the second insulation layer PAS2 and the conductive layer 6. Here, the resin material 8 in a liquid form which spreads by wetting and reaches the groove portion partially, as shown in FIG. 6, flows into the groove portion. Here, the resin material 8 in a liquid form exhibits low wettability to an ITO film and hence, by forming the conductive layer 6 made of ITO on a surface of the groove portion, the spreading by wetting of the resin material 8 in a liquid form can be stopped by the groove portion.

Figure 7:
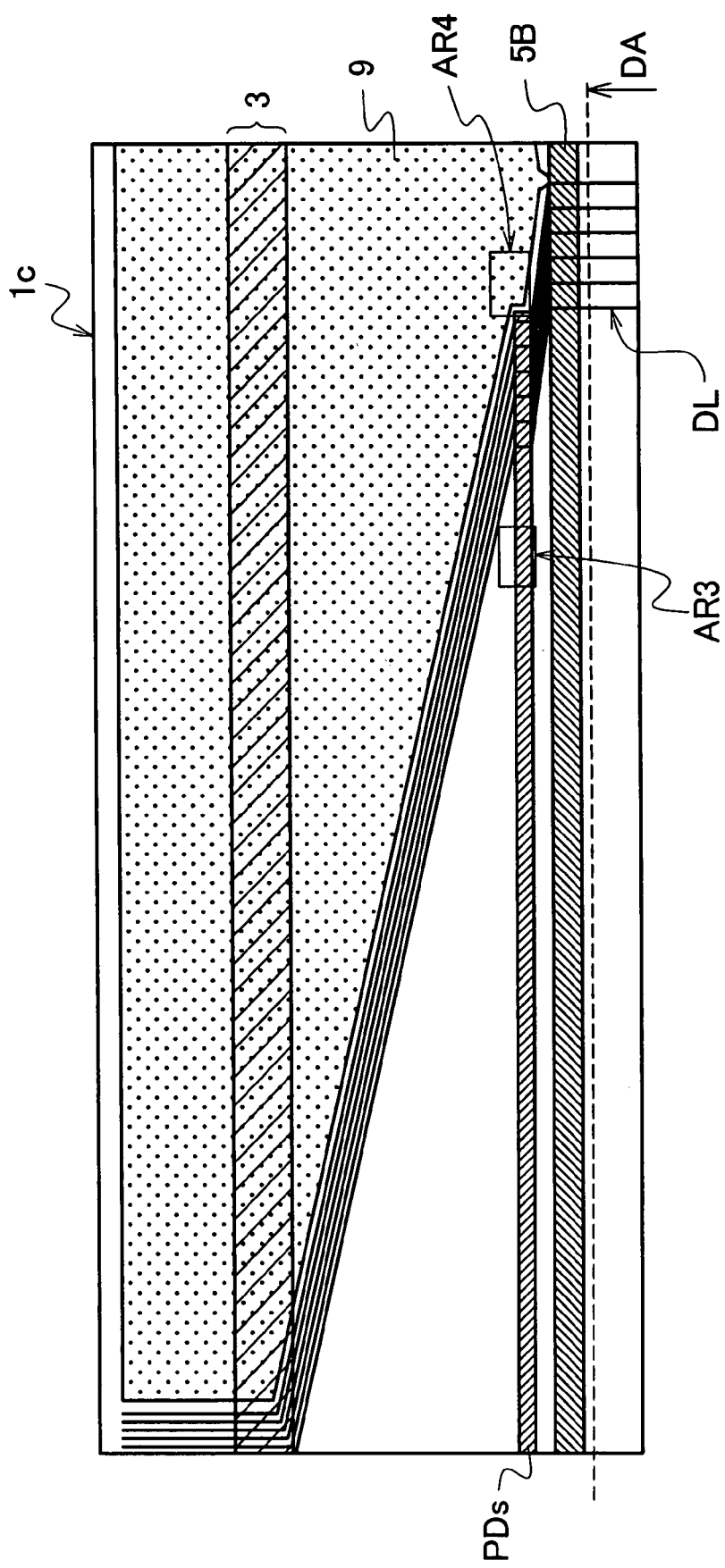
FIG. 7 is a schematic plan view showing the schematic constitution of a TFT substrate in a region AR2 shown in FIG. 1 in an enlarged manner.
Figure 8:
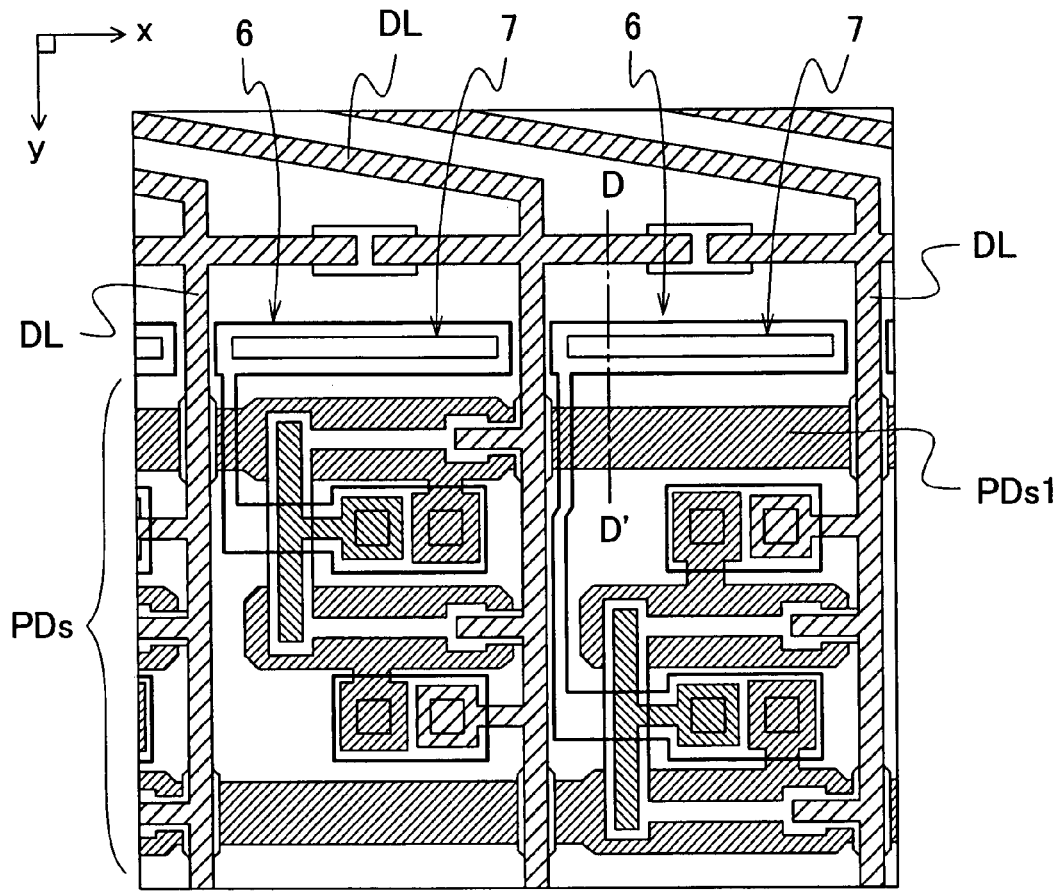
FIG. 8 is a schematic plan view showing the schematic constitution of a region AR3 shown in FIG. 7 in an enlarged manner.
Figure 9:
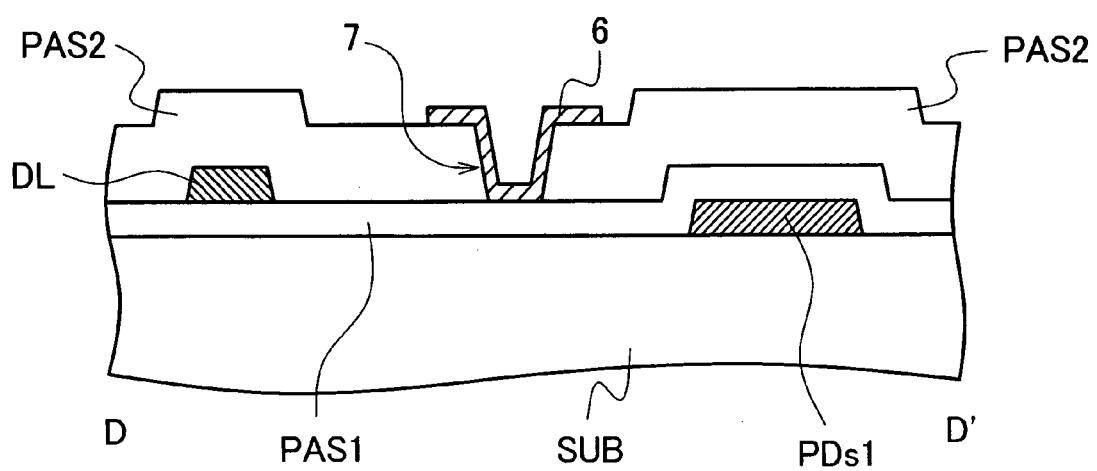
FIG. 9 is a schematic cross-sectional view taken along a line D-D' in FIG. 8.
Figure 10:
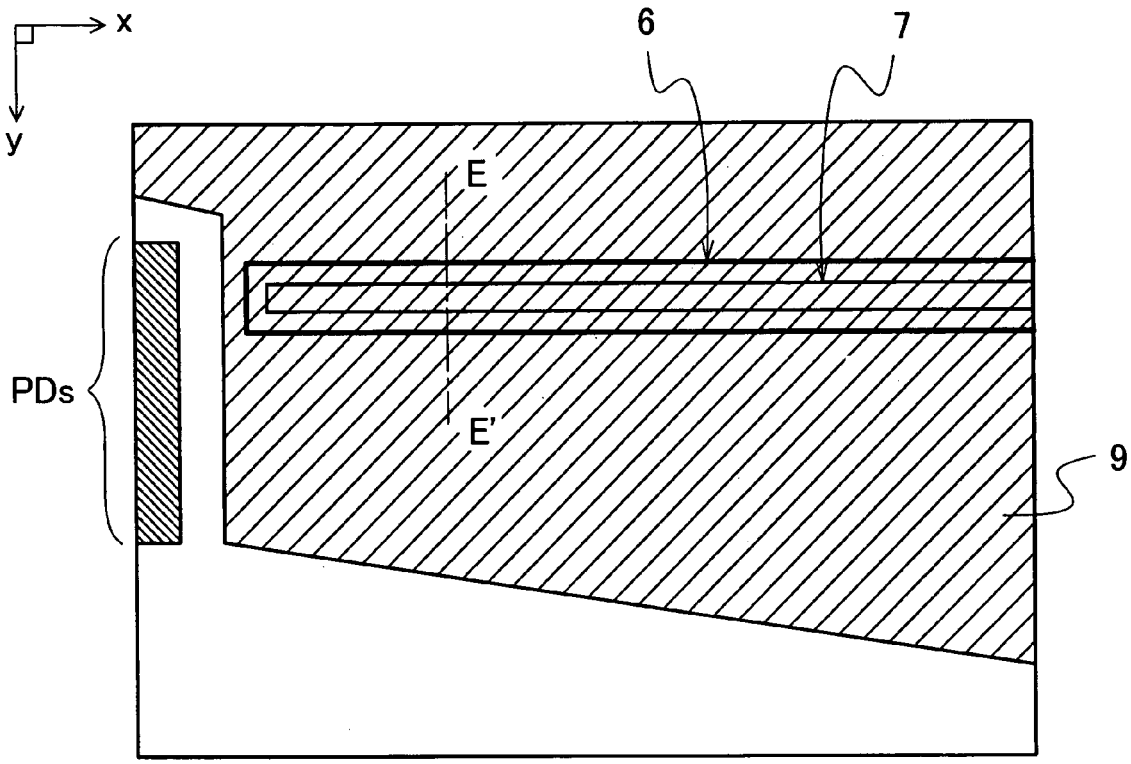
FIG. 10 is a schematic plan view showing the schematic constitution of a region AR4 shown in FIG. 7 in an enlarged manner.
Figure 11:
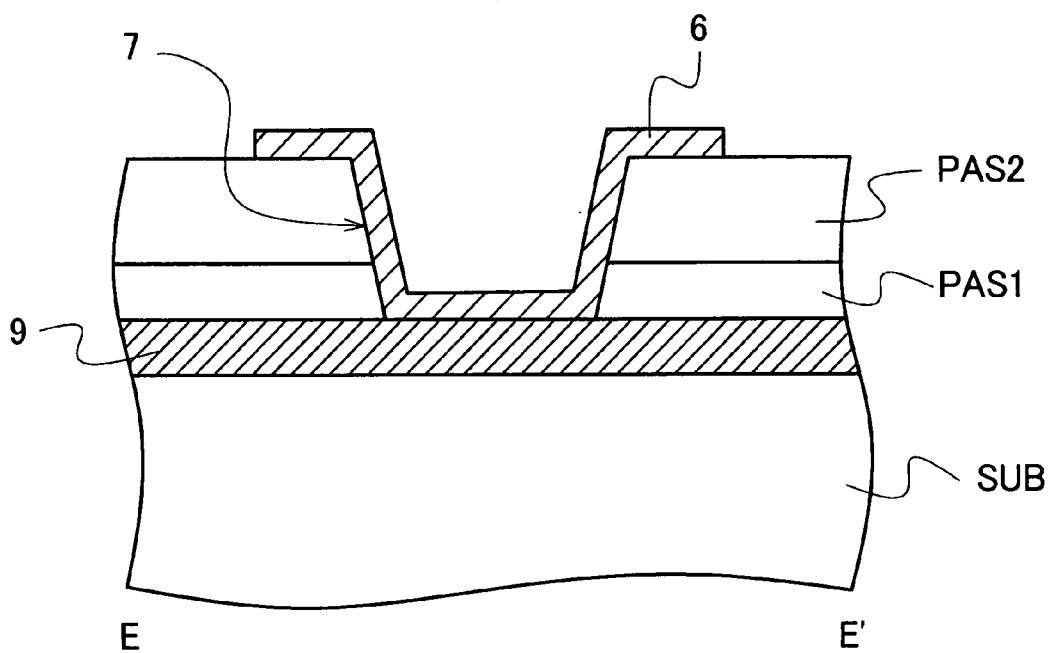
FIG. 11 is a schematic cross-sectional view taken along a line E-E' in FIG. 10.

FIG. 7 is a schematic plan view showing the schematic constitution of the TFT substrate in a region AR2 shown in FIG. 1 in an enlarged manner. FIG. 8 is a schematic plan view showing the schematic constitution of a region AR3 shown in FIG. 7 in an enlarged manner. FIG. 9 is a schematic cross-sectional view taken along a line D-D' in FIG. 8. FIG. 10 is a schematic plan view showing the schematic constitution of a region AR4 shown in FIG. 7 in an enlarged manner. FIG. 11 is a schematic cross-sectional view taken along a line E-E' in FIG. 10.

In the liquid crystal display panel of this embodiment, to observe an outer peripheral portion of the display region of the TFT substrate 1 close to the drain side 1c, for example, in an enlarged manner as shown in FIG. 10, outside the display region DA, a common bus line 5B is formed along the outer periphery of the display region DA. Here, the common bus line 5B is simultaneously formed with the scanning signal lines GL, and the first insulation layer PAS1 is interposed between the common bus line 5B and the video signal lines DL.

Further, a region which is arranged outside the common bus line 5B as viewed from the display region DA and the scanning signal lines DL are collectively arranged, for example, as shown in FIG. 7 to FIG. 9, includes a region PDs where protective diodes are formed. Here, in the region PDs where the protective diodes are formed, for example, as shown in FIG. 8 and FIG. 9, a groove portion which is constituted of the recessed grooves 7 which are formed in the second insulation layer PAS2 outside (drain side 1c side of) a protective diode common line (conductive layer) PDs1 formed in the region PDs1 and the conductive layer 6 which covers the recessed grooves 7 are formed.

Further, on the drain side 1c of the liquid crystal display panel, for example, as shown in FIG. 7, a common input pattern 9 for applying a common voltage to the common bus line 5B is formed. The common input pattern 9 is simultaneously formed with the scanning signal lines GL. In a region where the common input pattern 9 is formed, for example, as shown in FIG. 10 and FIG. 11, a groove portion which is constituted of a recessed groove 7 which is formed in the second insulation layer PAS2 and the first insulation layer PAS1 and reaches the common input pattern 9 and the conductive layer 6 which covers the recessed groove 7 are formed.

Figure 12:
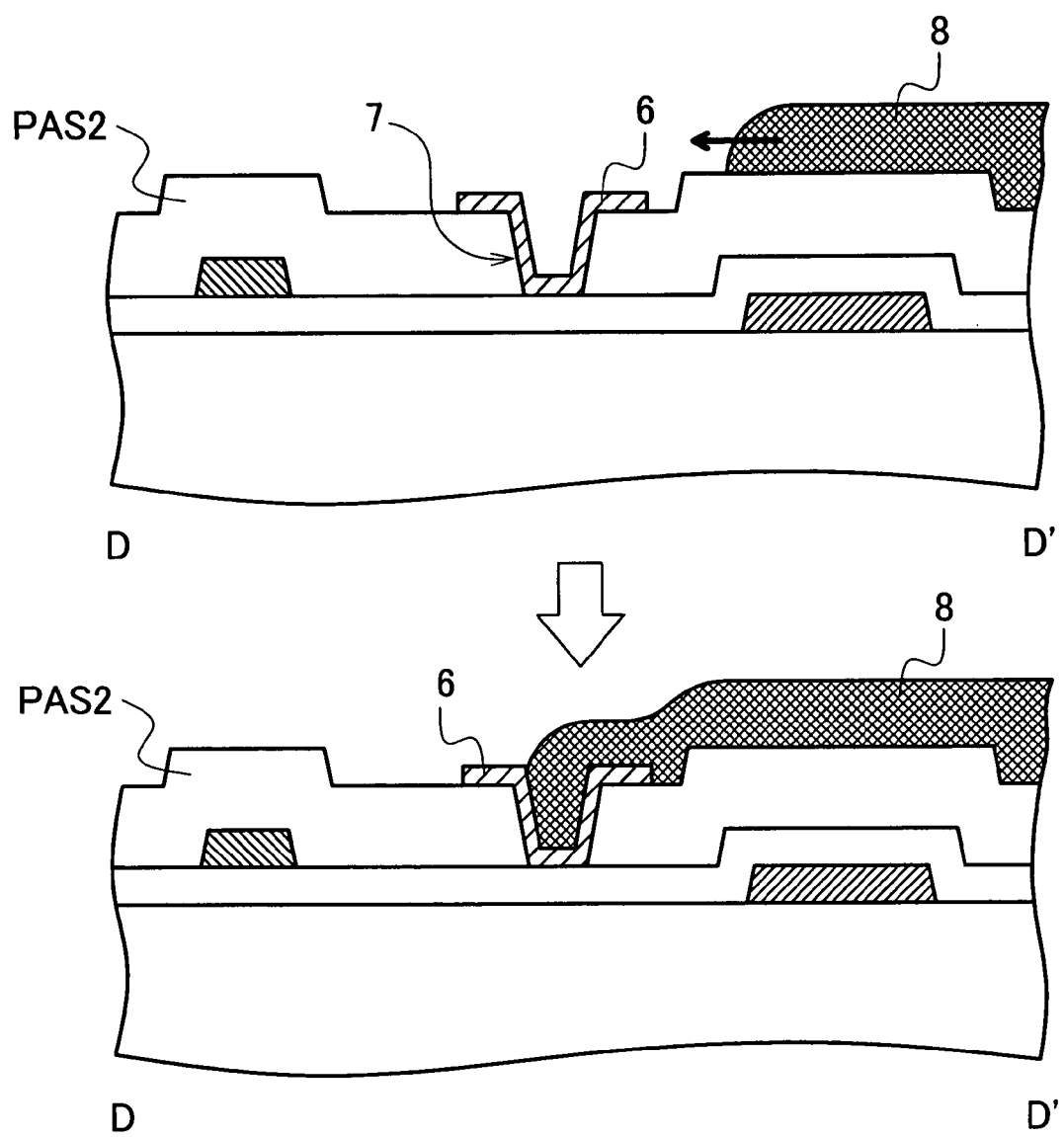
FIG. 12 is a schematic cross-sectional view for explaining spreading of a material when the orientation film is printed.

FIG. 12 is a schematic cross-sectional view for explaining the spreading of a material when the orientation film is printed. Here, FIG. 12 is a view showing the spreading of a material when the orientation film is printed with the same cross-section shown in FIG. 9.

In forming the orientation film on the TFT substrate 1, for example, by printing a resin material in a liquid form only on the display region and the slight region around the display region using an inkjet printing method, the resin material 8 in a liquid form spreads by wetting substantially isotropically in the direction toward the outside from the display region. Accordingly, the resin material 8 in a liquid form also spreads by wetting in the direction toward the drain side 1c from the display region DA.

However, in a case of the TFT substrate 1 in this embodiment, even when the printed resin material 8 in a liquid form spreads by wetting in the direction toward the drain side 1c from the display region DA, before the resin material 8 in a liquid form reaches a region where the sealing material 3 is arranged, passes the groove portion constituted of the recessed grooves 7 formed in the second insulation layer PAS2 and the conductive layer 6. Here, the resin material 8 in a liquid form which spreads by wetting and reaches the groove portion, as shown in FIG. 12, partially flows into the groove portion. Further, the resin material 8 in a liquid form exhibits low wettability to the ITO film and hence, by forming the conductive layer 6 made of ITO on the surface of the groove portion, the spreading by wetting of the resin material 8 in a liquid form can be stopped by the groove portion.

Figure 13:
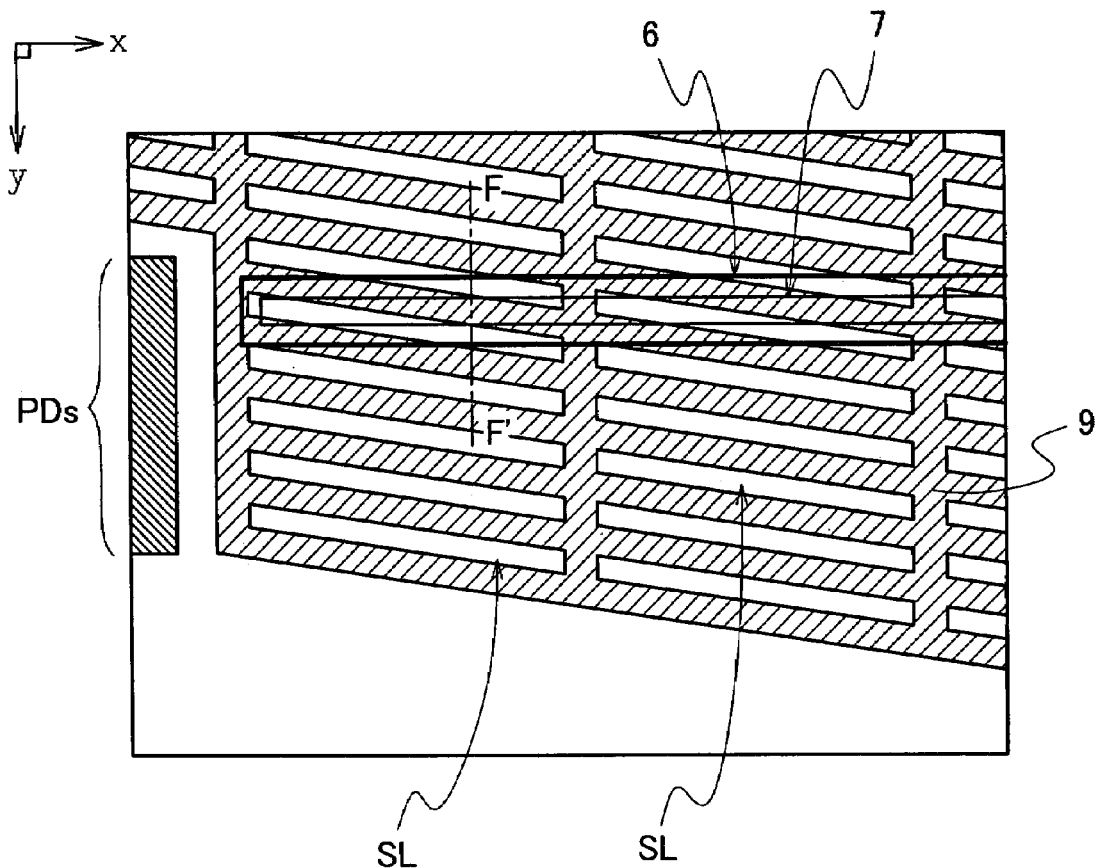
FIG. 13 is a schematic plan view for explaining a modification of the groove portion formed on a drain side of the TFT substrate.
Figure 14:
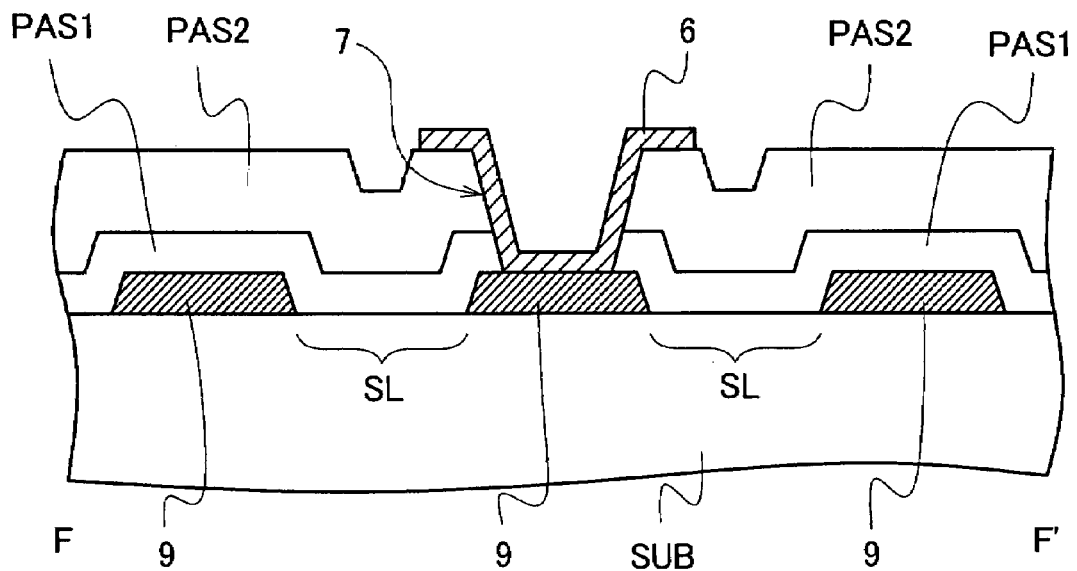
FIG. 14 is a schematic cross-sectional view taken along a line F-F' in FIG. 13.

FIG. 13 is a schematic plan view for explaining a modification of the groove portion formed on the drain side of the TFT substrate. FIG. 14 is a schematic cross-sectional view taken along a line F-F' in FIG. 13.

In the example shown in FIG. 10 and FIG. 11, the common input pattern 9 is a so-called matted pattern and hence, a surface of the second insulation layer PAS2 around the groove portion is flat. Accordingly, only with the provision of the groove portion, there exists a possibility that the spreading by wetting of the resin material 8 in a liquid form cannot be stopped.

Accordingly, in the TFT substrate 1 of the modification, for example, as shown in FIG. 13 and FIG. 14, it is preferable to form slits SL in the common input pattern 9. By forming the slits SL in this manner, for example, as shown in FIG. 14, a stepped portion is generated between a portion of the TFT substrate 1 where the common input pattern 9 is interposed and a portion of the TFT substrate 1 where the common input pattern 9 is not interposed thus suppressing the spreading by wetting of the resin material 8 in a liquid form.

Figure 15:
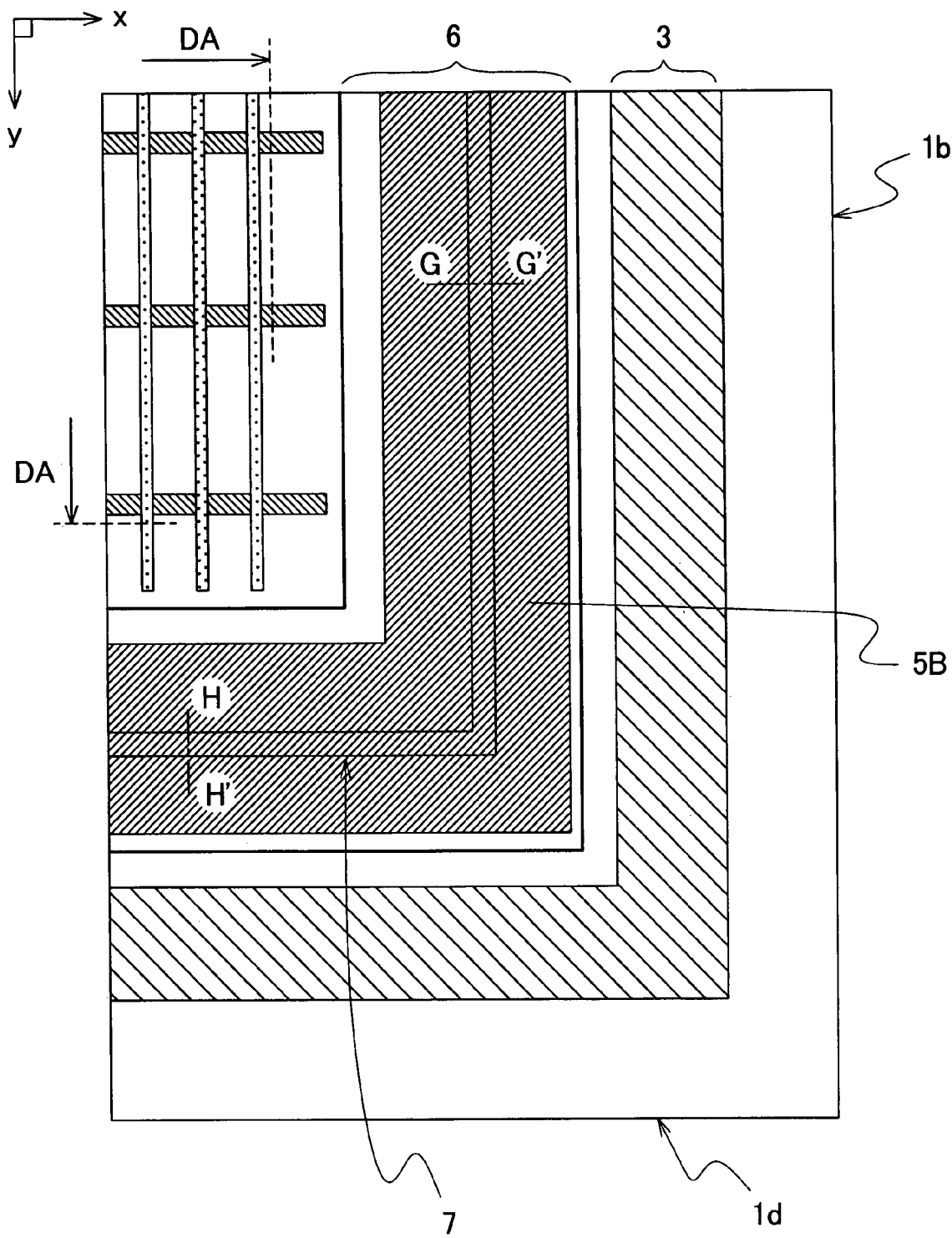
FIG. 15 is a schematic plan view showing the schematic constitution of the TFT substrate in a region AR5 shown in FIG. 1 in an enlarged manner.
Figure 16:
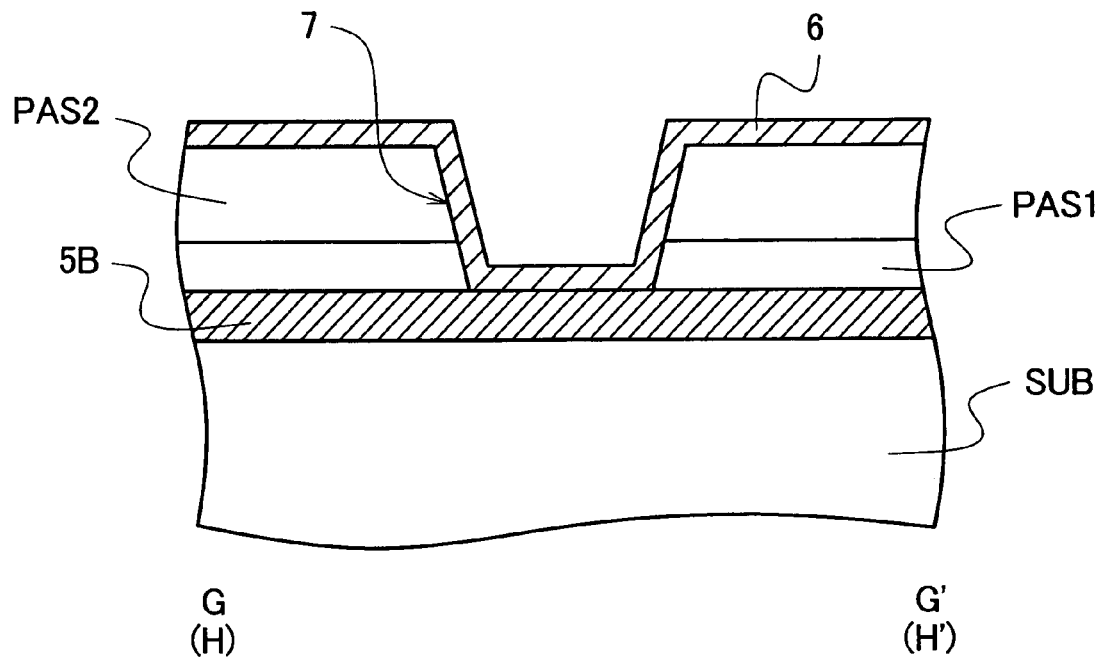
FIG. 16 is a schematic cross-sectional view taken along a line G-G' and a line H-H' in FIG. 15.

FIG. 15 is a schematic plan view showing the schematic constitution of the TFT substrate in a region AR5 shown in FIG. 1 in an enlarged manner. FIG. 16 is a schematic cross-sectional view taken along a line G-G' and a line H-H' in FIG. 15 respectively.

The explanation heretofore is made with respect to the method for controlling the spreading by wetting of the resin material 8 in a liquid form in the vicinity of the gate side 1a and the drain side 1c of the TFT substrate 1. Here, the explanation is made with respect to a method for controlling the spreading by wetting of the resin material 8 in a liquid form in a vicinity of the opposite gate side 1b and the opposite drain side 1d of the TFT substrate 1.

At a corner portion where the opposite gate side 1b and the opposite drain side 1d abut each other in the TFT substrate, for example, as shown in FIG. 15, a common bus line 5B is arranged outside the display region DA along the outer periphery of the display region DA. The common bus line 5B is formed, for example, simultaneously with the scanning signal lines GL and, as shown in FIG. 16, is arranged between the glass substrate SUB and the first insulation layer PAS1.

Further, on a portion of the common bus line 5B along the opposite gate side 1b, an elongated groove portion which extends in the direction along the opposite gate side 1b is formed. On a portion of the common bus line 5B along the opposite drain side 1d, an elongated groove portion which extends in the direction along the opposite drain side 1d is formed. These two groove portions are continuously formed at the corner portion of the common bus line 5B.

Further, the groove portions formed along the opposite gate side 1b and the opposite drain side 1d are, for example, as shown in FIG. 16, respectively constituted of a recessed groove 7 which is formed in the first insulation layer PAS1 and the second insulation layer PAS2 which are stacked on the common bus line 5B and a conductive layer 6 which covers the recessed groove 7. Here, it is preferable to set a length of the recessed groove 7 in the direction along the opposite gate side 1b to a value larger than a distance between two scanning signal lines which are arranged at outermost sides out of the plurality of scanning signal lines. In the same manner, it is preferable to set a length of the recessed groove 7 in the direction along the opposite drain side 1b to a value larger than a distance between two video signal lines which are arranged at outermost sides out of the plurality of video signal lines. Here, the conductive layer 6 is, for example, as shown in FIG. 15, formed such that the conductive layer 6 covers the whole common bus line 5B in a plan view.

Due to such a constitution, also when the printed resin material 8 in a liquid form spreads by wetting in the direction toward the opposite gate side 1b and the opposite drain side 1d from the display region DA, before reaching the region where the sealing material 3 is arranged, the resin material 8 in a liquid form passes the groove portion constituted of the recessed groove 7 formed in the second insulation layer PAS2 and the first insulation layer PAS1 and the conductive layer 6. Accordingly, the resin material 8 in a liquid form which spreads by wetting and reaches the groove portion partially flows into the groove portion. Further, the resin material 8 in a liquid form exhibits low wettability to the ITO film and hence, by forming the conductive layer 6 made of ITO on the surface of the groove portion, the spreading by wetting of the resin material 8 in a liquid form can be stopped by the groove portion.

Further, in the embodiment shown in FIG. 15, one groove portion is formed. However, it is needless to say that the constitution of the groove portion is not limited to such a case and double groove portions or triple groove portions may be formed toward the region where the sealing material 3 is arranged from the display region DA.

Figure 17:
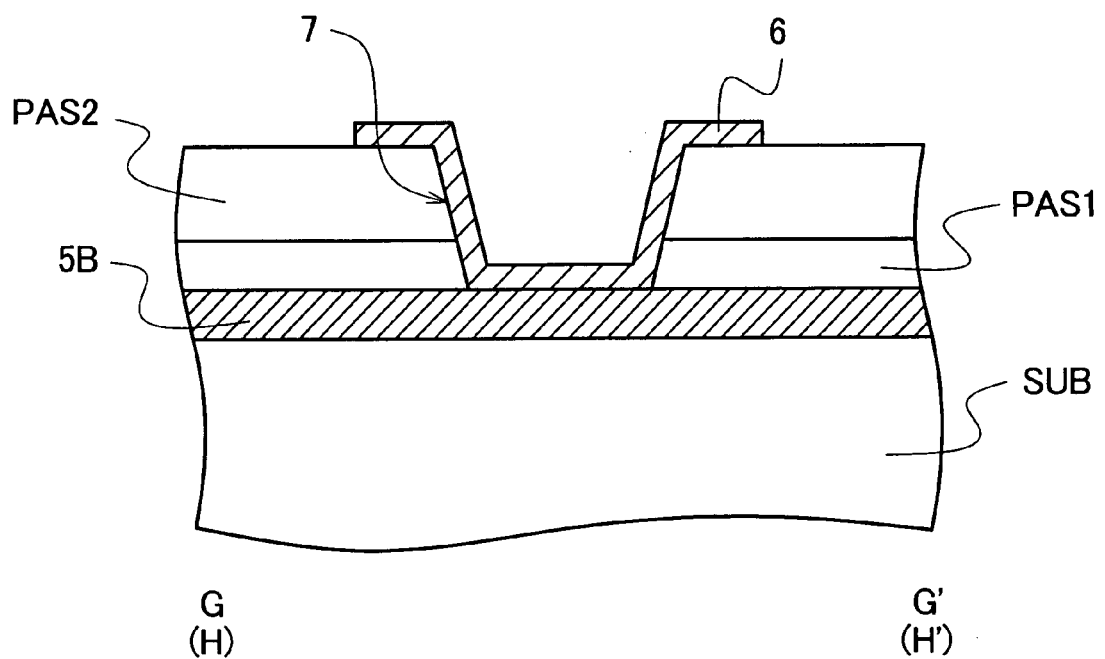
FIG. 17 is a schematic cross-sectional view for explaining a first modification of the groove portions formed in the opposite gate side and the opposite drain side of the TFT substrate.
Figure 18:
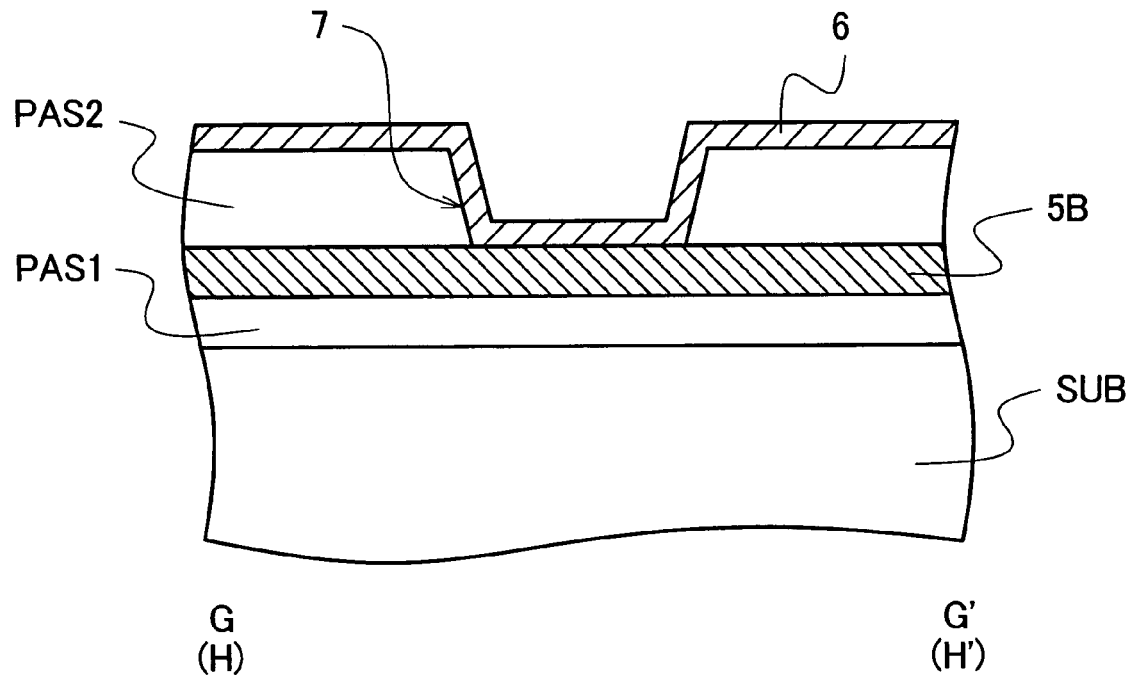
FIG. 18 is a schematic cross-sectional view for explaining a second modification of the groove portions formed in the opposite gate side and the opposite drain side of the TFT substrate.
Figure 19:
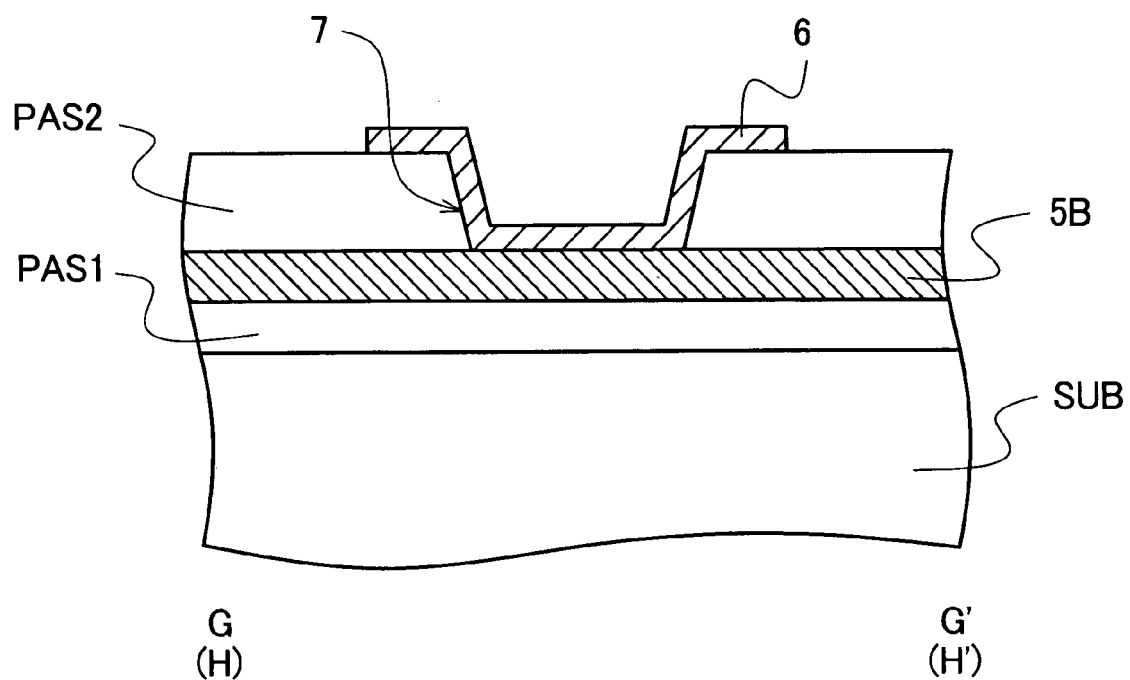
FIG. 19 is a schematic cross-sectional view for explaining a third modification of the groove portions formed in the opposite gate side and the opposite drain side of the TFT substrate.

FIG. 17 is a schematic cross-sectional view for explaining a first modification of the groove portions formed in the opposite gate side and the opposite drain side of the TFT substrate. FIG. 18 is a schematic cross-sectional view for explaining a second modification of the groove portions formed in the opposite gate side and the opposite drain side of the TFT substrate. FIG. 19 is a schematic cross-sectional view for explaining a third modification of the groove portions formed in the opposite gate side and the opposite drain side of the TFT substrate.

In FIG. 15 and FIG. 16, a case in which the conductive layer 6 is formed such that the conductive layer 6 covers whole common bus line 5B in a plan view is exemplified. However, it is needless to say that the constitution of the conductive layer is not limited to such a case and, for example, as shown in FIG. 17, the conductive layer 6 may be formed only on and around the recessed groove 7 which is formed in the first insulation layer PAS1 and the second insulation layer PAS2.

Further, in FIG. 15 and FIG. 16, a case in which the common bus line 5B is formed simultaneously with the formation of the scanning signal lines GL is shown. However, it is needless to say that the common bus line 5B may be formed simultaneously with the formation of the video signal lines. In such a case, the groove portion is, for example, as shown in FIG. 18, constituted of a groove portion 7 which is formed in the second insulation layer PAS2 and the conductive layer 6 which is formed on the surface of the second insulation layer PAS2. Further, for example, as shown in FIG. 19, the conductive layer 6 may be formed only on and around the groove portion 7.

As has been explained heretofore, according to the embodiment, in the TFT substrate 1, in the substantially annular region which is arranged inside the region where the sealing material 3 is arranged and outside the display region DA, the groove portion which is constituted of the recessed grooves 7 formed in the insulation layer and the conductive layer 6 which extends along the side surfaces and the bottom surfaces of the recessed grooves 7 is formed. Accordingly, it is possible to suppress the spreading by wetting of the resin material 8 in a liquid form on the orientation film of the liquid crystal display panel outside the display region and to maintain the uniformity of the film thickness of the orientation film in the inside of the display region.

Figure 20:
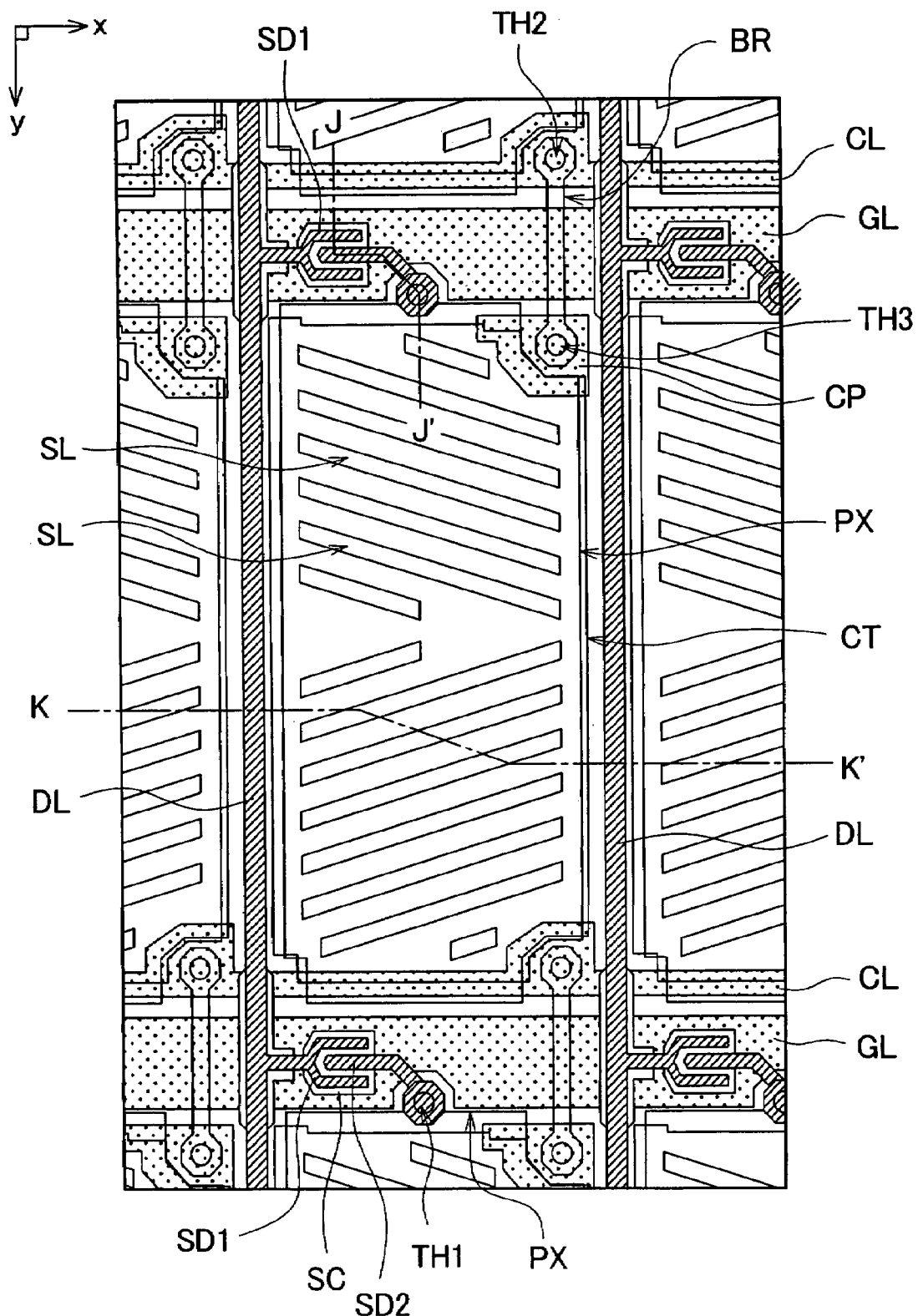
FIG. 20 is a schematic plan view showing one constitutional example of one pixel of the display region of the TFT substrate as viewed from a viewer's side.
Figure 21:
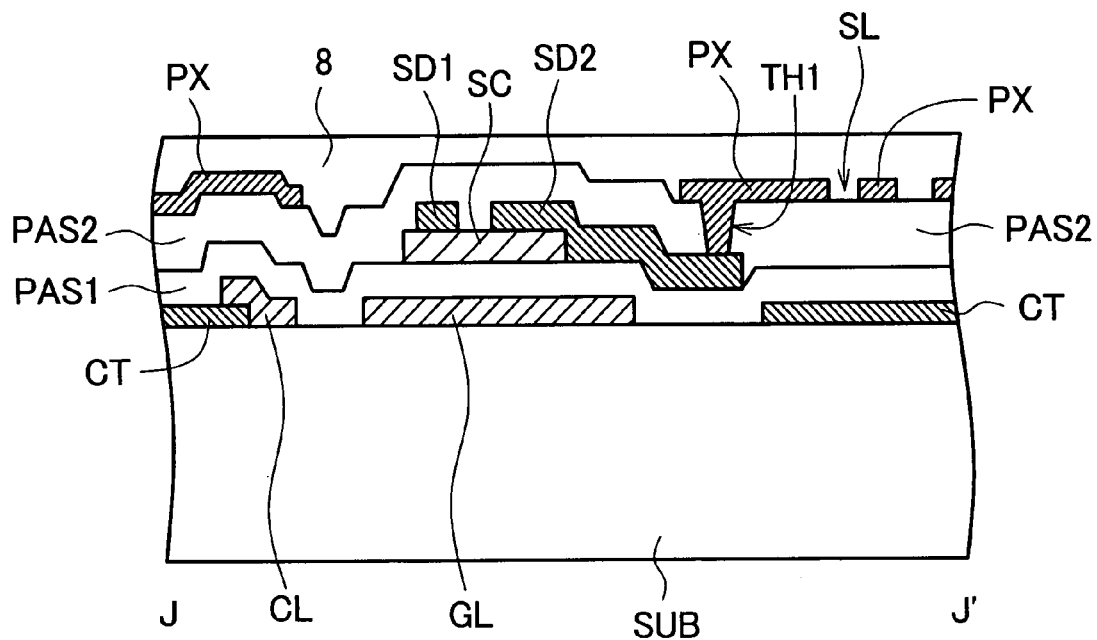
FIG. 21 is a schematic cross-sectional view taken along a line J-J' in FIG. 20.
Figure 22:
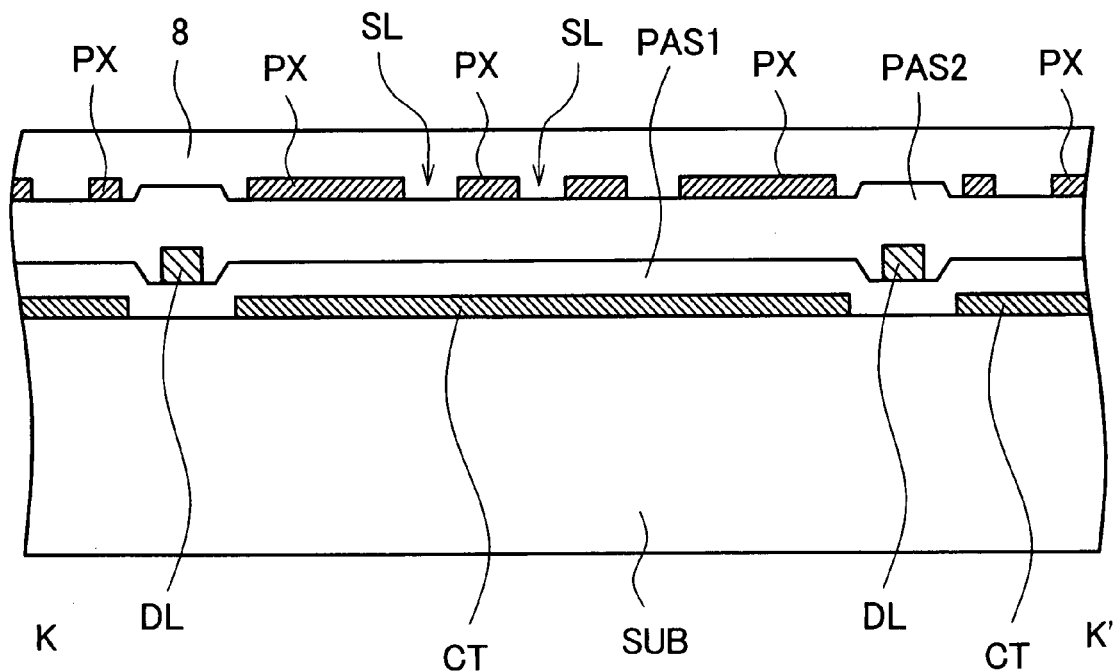
FIG. 22 is a schematic cross-sectional view taken along a line K-K' in FIG. 20.

FIG. 20 to FIG. 22 show schematic views showing one constitutional example of one pixel which is formed in the display region of the liquid crystal display panel of the embodiment.

FIG. 20 is a schematic plan view showing one constitutional example of one pixel of the display region of the TFT substrate as viewed from a viewer's side. FIG. 21 is a schematic cross-sectional view taken along a line J-J' in FIG. 20. FIG. 22 is a schematic cross-sectional view taken along a line K-K' in FIG. 20.

When the liquid crystal display panel adopts a driving method which is referred to as a lateral electric field method such as an IPS method, the pixel electrodes and the counter electrodes are formed on the TFT substrate 1. Further, the IPS method is classified into, for example, a method in which the pixel electrodes and the counter electrodes having a comb-teeth shape in a plan view are arranged on the same layer, that is, on the same insulation layer and a method in which the pixel electrodes and the counter electrodes are arranged in parallel to each other by way of an insulation layer. Out of these methods, in case of the IPS method which arranges the pixel electrodes and the counter electrodes in parallel to each other by way of the insulation layer, one pixel of the TFT substrate is, for example, constituted in the same manner as the constitution shown in FIG. 20 to FIG. 22.

First of all, on the surface of the glass substrate SUB of the TFT substrate 1, a plurality of scanning signal lines GL which extends in the x direction, common signal lines CL which are arranged in parallel to the respective scanning signal lines GL, counter electrodes CT which are connected to the common signal lines CL are formed. Here, the respective common signal lines CL are, for example, as shown in FIG. 3, connected to the common bus line 5A outside the display region DA. Further, on a side opposite to the direction along which the common signal lines CL are arranged as viewed from the scanning signal lines GL, common connection pads CP which are connected to the counter electrodes CT are formed.

Then, on the scanning signal lines GL, the counter electrodes CT and the like, the semiconductor layers SC, the video signal lines DL, the drain electrodes SD1, and the source electrodes SD2 are formed by way of the first insulation layer PAS1. Here, the semiconductor layers SC are made of amorphous silicon (a-Si), for example. The semiconductor layers SC include, besides semiconductor layers SC which function as channel layers of the TFT elements, for example, semiconductors SC which prevent short-circuiting between the scanning lines GL and the video signal lines DL at portions where the scanning lines GL and the video signal lines DL stereoscopically intersect with each other. Further, in this case, the semiconductor layers SC which function as channel layers of the TFT elements are formed on the scanning signal lines GL by way of the first insulation layer PAS1, and the first insulation layer PAS1 which is interposed between the scanning signal lines GL and the semiconductor layers SC functions as a gate insulation film of the TFT elements.

Further, the video signal lines DL are signal lines which extend in the y direction and portions of the video signal lines DL are bifurcated and are formed on the semiconductor layer SC which function as channel layers of the TFT elements. The portions which are bifurcated from the video signal lines DL constitute the drain electrodes SD1.

On the semiconductor layers SC, the video signal lines DL and the like, the pixel electrodes PX and bridge lines BR are formed by way of a second insulation layer PAS2. The pixel electrodes PX are electrically connected with the source electrodes SD2 via through holes TH3. Further, the pixel electrode PX forms a plurality of slits (opening portions) SL in a region thereof which overlaps the counter electrode CT in a plan view.

Further, the bridge line BR is a line which electrically connects two counter electrodes CT which are arranged with one scanning signal line GL therebetween. The bridge line BR is electrically connected with a common signal line CL and a common connection pad CP which are arranged with the scanning signal line GL sandwiched therebetween via through holes TH4, TH5.

Here, it is needless to say that the TFT substrate 1 in the liquid crystal display panel according to the present invention is not limited to the case in which one pixel has the particular constitution and is applicable to the TFT substrates having various constitutions known in general conventionally.

Although the present invention has been explained specifically in conjunction with the embodiments, it is needless to say that the present invention is not limited to the above-mentioned embodiment and various modifications are conceivable without departing from the gist of the present invention.

For example, in this embodiment, the explanation is made with respect to an example which provides the groove portion which suppresses the spreading by wetting of the orientation film on the TFT substrate 1. However, it is needless to say that the present invention is not limited to the TFT substrate 1 and is also applicable to the counter substrate, for example.

When the liquid crystal display panel adopts the vertical electric field drive method such as the TN method or the VA method, a counter electrode CT is formed on the counter substrate 2. In this case, a black matrix (light blocking pattern) and color filters are formed on a surface of a glass substrate, and the counter electrode is formed on these black matrix and the color filters by way of an overcoat layer, for example. Accordingly, for example, by forming the groove portion in such a manner that recessed grooves which are formed in the overcoat layer are formed in the overcoat layer in a region inside a region where the sealing material 3 is arranged and outside the display region in forming the overcoat layer and by extending the counter electrode on surfaces of the recessed grooves, it is possible to prevent the spreading by wetting of the orientation film by the groove portion.

What is claimed is:

1. A liquid crystal display device including a display panel which arranges a sealing material having an annular shape between a pair of substrates, seals a liquid crystal material in a space surrounded by the pair of substrates and the sealing material, and forms a display region in a region where the pair of substrates and the liquid crystal material overlap each other in a plan view, wherein
   orientation films are formed on surfaces of the liquid crystal side of the pair of substrates,
   at least one substrate out of the pair of substrates includes a first conductive layer, a second conductive layer and an insulation layer interposed between the first conductive layer and the second conductive layer, between the orientation film and the substrate in an annular region which is arranged inside a region where the sealing material is arranged and outside the display region,
   the insulation layer includes a groove portion having recessed grooves which extend at least in the direction along an outer periphery of the display region and opened on an orientation film side, and
   the first conductive layer is formed conforming to a shape of the recessed groove.

2. A liquid crystal display device according to claim 1, wherein
   the substrate including the groove portion includes a plurality of scanning signal lines,
   a plurality of video signal lines which perpendicularly intersect the plurality of scanning signal lines,
   a TFT element and a pixel electrode which are arranged in a pixel region surrounded by two neighboring scanning signal lines and two neighboring video signal lines, and
   the first conductive layer is made of the same material as the pixel electrode.

3. A liquid crystal display device according to claim 2, wherein the annular region has a rectangular shape, the scanning signal lines are formed on one side of the annular region such that the scanning signal lines traverse the annular region from the display region to the sealing material, and
   each recessed groove is formed for every space defined between the scanning signal lines in the inside of the annular region.

4. A liquid crystal display device according to claim 3, wherein the recessed grooves formed between the scanning signal lines are constituted of grooves formed along an outer periphery of the display region and grooves formed along the direction perpendicular to the outer periphery of the display region.

5. A liquid crystal display device according to claim 2, wherein the annular region has a rectangular shape,
   the video signal lines are formed on one side of the annular region such that the video signal lines traverse the annular region from the display region to the sealing material, and
   each recessed groove is formed for every space defined between the video signal lines in the inside of the annular region.

6. A liquid crystal display device according to claim 2, wherein the second conductive layer is a common bus line which supplies electric signals to a common electrode formed in the pixel region, and
   the common bus line is formed along the display region in the inside of the annular region.

7. A liquid crystal display device according to claim 2, wherein the second conductive layer forms a portion of a protective diode, and
   a region which forms the protective diode there in is formed along the display region in the inside of the annular region.

8. A liquid crystal display device according to claim 6, wherein the annular region has a rectangular shape,
   the scanning signal lines are formed on one side of the annular region such that the scanning signal lines traverse the annular region from the display region to the sealing material,
   the video signal lines are formed on another side of the annular region such that the video signal lines traverse the annular region from the display region to the sealing material, and
   the recessed grooves are formed on a side on which the scanning signal lines and the video signal lines are not formed such that the recessed portions are formed on the common bus in and along the display region.

9. A liquid crystal display device according to claim 1, wherein the first conductive layer is made of ITO (Indium Tin Oxide).

10. A liquid crystal display device according to claim 1, wherein the orientation film is applied to the substrate by coating using an inkjet printing method.

* * * * *